No. 894,803. PATENTED JULY 28, 1908.
T. V. SKELLY.
CHECK CONTROLLED MECHANISM.
APPLICATION FILED NOV. 6, 1907.
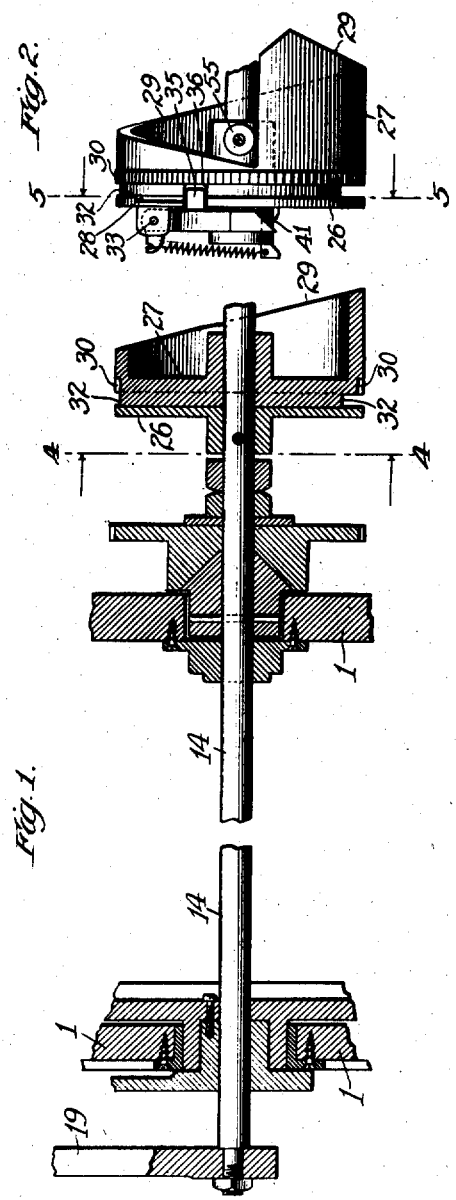
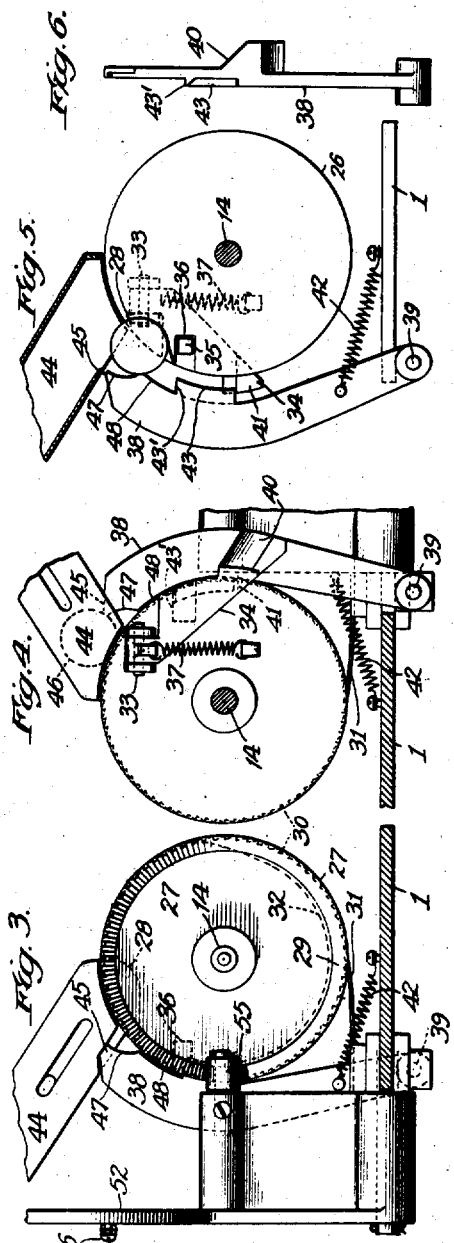
Witnesses
Harry R. L. White
Ray White
Inventor
Thomas V. Skelly
By Kummler & Kummler
Att'ys

UNITED STATES PATENT OFFICE.

THOMAS V. SKELLY, OF CHICAGO, ILLINOIS.

CHECK-CONTROLLED MECHANISM.

No. 894,803.      Specification of Letters Patent.      Patented July 28, 1908.

Original application filed July 22, 1907, Serial No. 384,952. Divided and this application filed November 6, 1907.
Serial No. 400,993.

*To all whom it may concern:*

Be it known that I, THOMAS V. SKELLY, a citizen of the United States of America, and a resident of Chicago, county of Cook, State of Illinois, have invented certain new and useful Improvements in Check - Controlled Mechanisms, of which the following is a specification.

The main objects of this invention are to provide an improved construction for check controlled mechanisms; to provide a mechanism of this class which is particularly adapted for application to a machine which may be set in operation through the rotation of a crank; to provide an improved form of rotating clutch for coin operated devices, in which the coin itself is the means for throwing the clutch to permit the operation of the mechanism. These objects are accomplished by the device shown in the accompanying drawings, which illustrate a specific embodiment of this invention, the particular arrangement of parts being such as is suitable for check controlled mechanism when applied to phonograph operating mechanism such as is shown in my co-pending application, Serial No. 384,952, filed July 22nd, 1907, of which the present application is a division.

Figure 1 of the drawings is a detail of the crank shaft and check controlled clutch, by means of which is accomplished the operation of the machine to which the coin controlled mechanism is attached, the parts which are mounted on said shaft being shown in section. Fig. 2 is a side elevation of clutch members, showing the same in engagement with each other. Fig. 3 is an elevation of the same, viewed from the right of Fig. 2, and showing some of the adjacent mechanism. Fig. 4 is a similar elevation, viewed from the left of Fig. 2, and corresponding to a section on the line 4—4 of Fig. 1. Fig. 5 is a section on the line 5—5 of Fig. 2, said section being in the plane of separation between the two clutch members. Fig. 6 is an elevation of the trip lever which prevents the operation of the clutch except in the presence of a coin.

Such parts of the supporting frame of the mechanism as are shown in the drawings are designated by the numeral 1. In the form shown in the drawings, the parts of the mechanism are so arranged as to control the operation of a machine and be in turn operated by means of an operating shaft 14. The shaft 14 is provided with a crank 19, by which it may be rotated by the operator. The shaft 14 also has mounted thereon a pair of clutch members 26 and 27 for controlling the operation of the machine, as will hereinafter appear.

The driving member 26 of the clutch is rigidly secured to the shaft 14 and has a recess 28 in its periphery, whose function will be hereinafter described. The driven member 27 is loosely mounted upon the shaft 14, and is provided with a helical cam surface 29 and an annular series of ratchet teeth 30.

The spring pawl 31 (Figs. 3 and 4) engages the ratchet teeth 30 and prevents the rotation of the member 27 except in the normal right-handed direction. The member 27 is also provided with a peripheral cam surface 32 adjacent to the ratchet teeth 30.

The member 26 has pivotally mounted thereon at 33 a dog or lever 34 which carries a tongue 35 extending through an opening in the member 26 and being movable into and out of engagement with a recess 36 in the member 27. The spring 37 normally urges the tongue 35 of the dog 34 toward the member 27, so that said tongue will normally enter the recess 36 and lock the members together as soon as the tongue and recess are in alinement with each other.

A trip arm 38 is pivotally mounted at 39 on the supporting frame and lies substantially in the same plane with the member 26. The arm 38 partly encircles the periphery of the member 26 and is provided with an inclined wedge surface 40 adapted to engage the inclined end 41 of the dog 34 and cause the detent 35 to be retracted to prevent it from entering the recess 36 when the shaft 14 is turned in its normal right hand direction, as indicated by the arrows on Figs. 3 and 4. The arm 38 is normally urged toward the periphery of the member 26 by means of the spring 42. The arm 38 is provided with a projecting lug 43 which extends into the cam groove 32 of the member 27 and rests upon the cam surface at the bottom of said groove. This cam is of suitable form to hold the arm 38 clear of the member 26 while the latter is rotating. This lug 43 also serves as a stop for engaging the stop shoulder 43' in the groove 32 to stop the member 27 in its normal initial position when the same has been rotated through a complete revolution.

The coin chute 44 is mounted in the supporting frame with its discharge end opposed to the periphery of the member 26. When the parts are in their normal position of rest, as illustrated in Fig. 3, the recess 28 of the member 26 will be in alinement with the coin chute 44, so that a coin inserted in said chute will be deposited in said recess or seat 28. In all other positions of the member 26 the periphery of said member will close the delivery end of the chute. This relation is best seen in Fig. 5. The chute 44 is slotted at one side to permit the outward passage of a coin when seated in the recess 28, and the arm 38 extends into said slot so as to normally close it.

The operation of the device shown is as follows:—The member 26 rotates whenever the shaft 14 is rotated. Normally, when no coin is seated in the recess 28, the arm 38 will occupy the position shown by full lines in Figs. 3 and 4. The dog 34 will then be lifted by the wedge surface 40 so as to prevent the detent from interlocking with the recess 36 during the rotation of the member 26. Thus the member 27 will remain at rest, regardless of the rotation of the member 26. When a coin is seated in the recess 28, the upper part of the periphery of said coin projects beyond the periphery of the member 26, and the revolution of said member in the direction of the arrow will then cause the inclined surface 47 of the arm 38 to ride up over the coin. The coin, in passing along the surface 48 of the arm 38, will then hold said arm retracted against the action of the spring 42 sufficiently far to hold the wedge 40 clear of the path of the dog 34, and thereby permit the detent 35 to enter the recess 36 and cause said member 27 to rotate with the member 26. After the coin has passed clear of the surface 48, it will fall into a suitably placed receptacle (not shown). The lug 43 will then ride in the cam groove 32 until the parts have made a complete revolution and again arrive at their normal initial position, when the arm 38 will have been allowed by the cam to return to the position shown by full lines in Fig. 10. During continued rotation of the shaft 14 and member 26, the wedge surface 40 will trip the detent 35; and, through engagement of the lug 43 with the shoulder 43', the member 27 will be secured against rotation beyond its initial position. Thus, for each coin inserted there can be but one revolution of the member 27, although the member 26 is free to rotate regardless of the presence of a coin.

In the form shown, the member 27 operates the machine to which the herein described check controlled mechanism is applied, by means of its spiral cam surface 29. A portion of the mechanism which co-acts with the cam surface 29 is indicated in Fig. 3 of the drawing and comprises a lever 52 pivotally mounted in the supporting frame and provided with a roller 55 located at a distance from the pivotal axis of the lever 52 and engaging the cam surface 29. The lever 52 may be normally urged by means of a spring attached at 56, so as to hold the roller 55 into engagement with the cam surface 29. On account of the shape of the cam 29, each revolution of the member 27 causes a complete forward and back oscillation of the lever 52.

The word "rotate" is herein used in its broadest sense, including in its meaning any angular movement about an axis. The word "revolution" is herein used to mean angular movement through 360°, or continuous rotation in one direction so as to return to the starting point.

What I claim as my invention and desire to secure by Letters Patent is:—

1. The combination of a pair of relatively rotatable members, a shoulder on one of said members, a movable detent on the other member normally urged into position for engagement with said shoulder when in alinement therewith, means for revolving one of said members in one direction, and check controlled mechanism arranged to normally prevent the engagement of said detent and shoulder and adapted through the presence of a check to permit such engagement.

2. The combination of a driving member and a driven member rotatably mounted in axial alinement with each other, a shoulder on said driven member, a detent movably mounted on said driving member and normally urged into position for engaging said shoulder to cause said driven member to rotate with said driving member, and check controlled means normally adapted to trip said detent and prevent its engagement with said shoulder during the rotation of said driving member, said means being adapted through engagement with a check to be shifted out of position for tripping said detent.

3. The combination of a driving member, a driven member separately journaled in axial alinement with said driving member, a detent movably mounted on said driving member, a shoulder on said driven member adapted through engagement with said detent to cause said driven member to rotate with said driving member, means adapted to normally shift said detent into position for engagement with said shoulder when said driving member is turned to a certain angular position relatively to said driven member, and check controlled mechanism arranged to engage said detent and normally prevent said means from shifting it into engagement with said shoulder, said check controlled mechanism being adapted through the presence of a check to permit such engagement.

4. In a check controlled apparatus, the combination of relatively movable driving and driven members, a detent mounted on said driving member and normally urged into position for engagement with said driven member, said driving member having therein a coin seat adapted to support a coin, a part extending along the path of a coin in said seat, being normally adapted to prevent the engagement of said detent with said driven member, said part being adapted to be engaged by a coin in said seat and to be thereby shifted to permit said detent to connect said members.

5. The combination of a pair of relatively rotatable members, a shoulder on one of said members, a detent on the other of said members movable into and out of position for engagement with said shoulder, said other member having therein a coin seat adapted to support a coin during a certain part of the rotation of said other member, a part extending along the path of a coin supported in said seat, being adapted to normally prevent said detent from engaging said shoulder and being adapted through engagement with a coin in said seat to be shifted so as to permit such engagement.

6. The combination of a rotatable driving member having therein a seat adapted to support a coin while said member is rotated, a driven member separately journaled in axial alinement with said driving member, a detent mounted on said driving member and normally urged into engagement with said driven member to cause them to rotate together, a part extending along the path of a coin in said seat, being adapted to normally prevent said detent from engagement with said driving member and, when engaged by a coin in said seat, to be shifted so as to permit such engagement.

7. In a check controlled apparatus, the combination of relatively movable driving and driven members, a detent mounted on said driving member and normally urged into position for engagement with said driven member, said driving member having therein a coin seat adapted to support a coin, a part extending along the path of a coin in said seat, being normally adapted to prevent the engagement of said detent with said driven member, said part being adapted to be engaged by a coin in said seat and to be thereby shifted to permit said detent to connect said members, and a coin chute adapted to deliver a coin into said seat.

8. The combination of a rotatable driving member, a driven member loosely mounted in alinement with said driving member and normally at rest, a lever fulcrumed on said driving member and having thereon a detent, said driven member having a recess adapted to be engaged by said detent, a spring normally urging said detent into said recess when in alinement therewith, a part extending along the path of said lever and adapted through engagement therewith to normally retract said detent from the recess, and check controlled means for shifting said part out of the path of said lever.

9. In a coin controlled apparatus, the combination of a shaft, a driving member rigid on said shaft, a driven member loosely mounted in axial alinement with said driving member, a detent movably mounted on said driving member and normally urged into engagement with said driven member for causing said driven member to rotate through the rotation of said driving member, a part adapted to normally prevent the rotation of said driven member and also adapted to normally prevent said detent from having driving engagement with said driven member, and means adapted through the presence of a coin for shifting said part so as to free said driven member and permit the engagement of said detent therewith.

10. In a coin controlled apparatus, the combination of a driving member and a driven member journaled in axial alinement with each other, means for revolving said driving member continuously in one direction, mechanism adapted through the presence of a check to cause said driven member to rotate with said driving member, said mechanism being arranged to discharge the check and stop said driven member in a certain initial position, regardless of the continued revolution of said driving member.

11. In a coin controlled apparatus, the combination of a driving member and a driven member journaled in axial alinement with each other, means for revolving said driving member continuously in one direction, mechanism adapted through the presence of a check to cause said driven member to rotate with said driving member, said mechanism being arranged to discharge the check and continue to drive said driven member until it arrives at a certain initial position and to stop said driven member at said initial position, regardless of the continued revolution of said driving member.

12. In a coin controlled apparatus, the combination of a driving member and a driven member journaled in axial alinement with each other, said driving member having in its periphery a coin seat, a movable detent mounted on said driving member and normally urged toward said driven member, a shoulder on said driven member adapted through engagement with said detent to cause said driven member to rotate with the driving member, a part disposed along the path of a coin in said seat and normally adapted to trip said detent and prevent its engagement with said shoulder, said part being adapted to be shifted by a coin in said seat to permit the engagement of said detent and shoulder and being adapted to return to its normal position and trip said detent when said driven member arrives at its initial position.

13. In a coin controlled apparatus, the combination of a driving member and a driven member journaled in axial alinement with each other, said driving member having in its periphery a coin seat, a movable detent mounted on said driving member and normally urged toward said driven member, a shoulder on said driven member adapted through engagement with said detent to cause said driven member to rotate with the driving member, a part disposed along the path of a coin in said seat and normally adapted to trip said detent and prevent its engagement with said shoulder, said part being adapted to be shifted by a coin in said seat to permit the engagement of said detent and shoulder and being adapted to return to its normal position and trip said detent when said driven member arrives at its initial position, and a stop on said part adapted when said part is in its normal position to prevent the rotation of said driven member.

Signed at Chicago this 4th day of November, 1907.

THOMAS V. SKELLY.

Witnesses:
E. A. RUMMLER,
MARY M. DILLMAN.